No. 638,422. Patented Dec. 5, 1899.
C. E. SCRIBNER.
CURRENT SUPPLY CIRCUIT FOR TELEPHONES.
(Application filed Aug. 1, 1895.)
(No Model.)
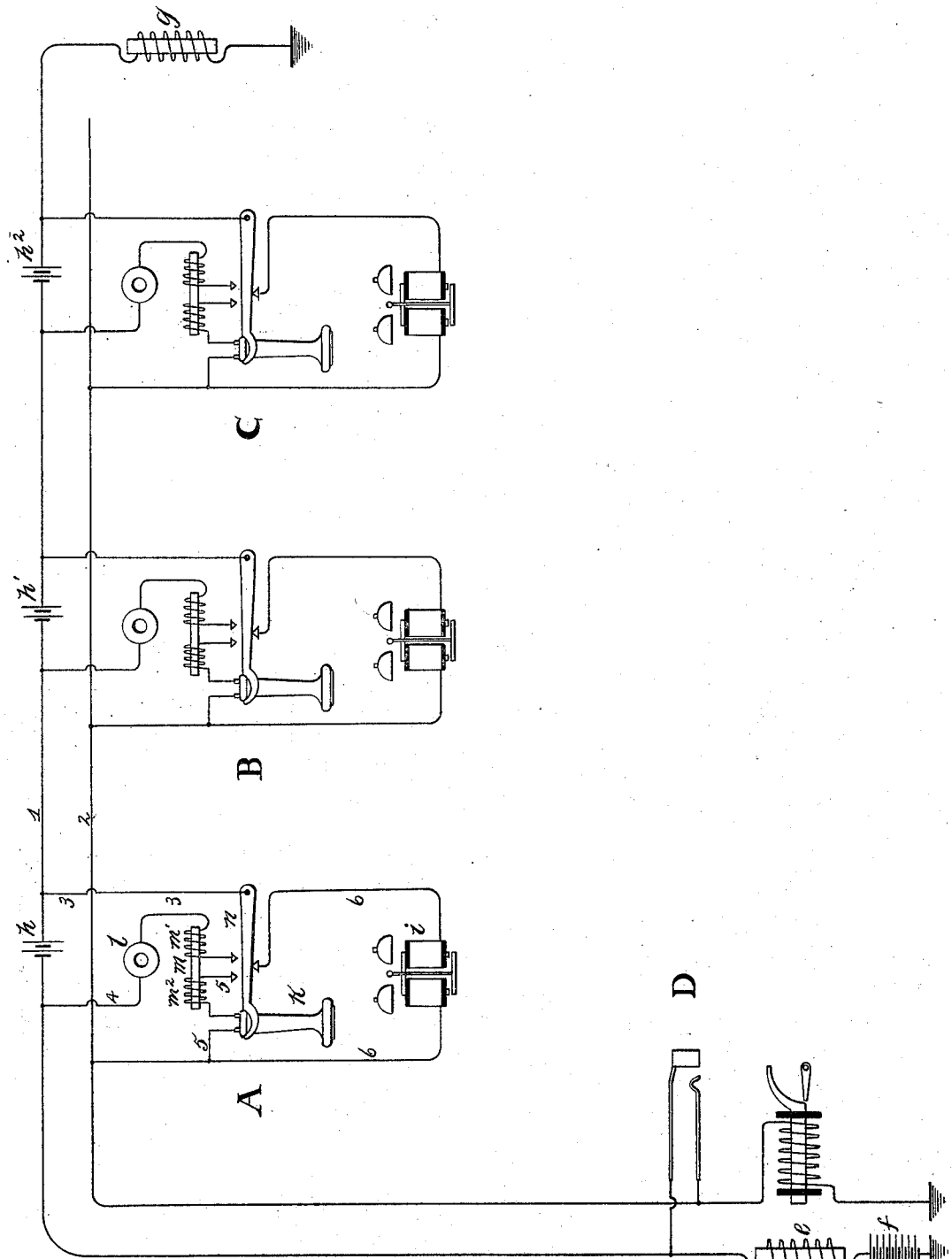
Witnesses
George L. Cragg.
John W. Sinclair
Inventor:
Charles E. Scribner.
By Barton & Brown
Attorneys

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

CURRENT-SUPPLY CIRCUIT FOR TELEPHONES.

SPECIFICATION forming part of Letters Patent No. 638,422, dated December 5, 1899.

Application filed August 1, 1895. Serial No. 557,826. (No model.)

*To all whom it may concern:*

Be it known that I, CHARLES E. SCRIBNER, a citizen of the United States, residing at Chicago, in the county of Cook and State of Illinois, have invented a certain new and useful Improvement in Current-Supply Circuits for Telephones, (Case No. 390,) of which the following is a full, clear, concise, and exact description, reference being had to the accompanying drawing, forming a part of this specification.

My invention applies to "party" telephone-lines in which the transmitting-telephone at each substation of the line is excited during its use by current from a storage-cell at the same station which is charged during the idleness of the line. The object of the invention is to provide a satisfactory mode of simultaneously charging the storage batteries at the different substations.

The invention consists in including the different storage batteries in series in the telephone line-circuit and in providing at the distant end of the series a normal return connection of such character that while permitting the flow through it of current for charging the storage batteries it shall not permit the shunting of telephonic currents from the line-circuit.

In systems of the type to which my invention applies one conductor of each telephone-line is usually connected at the central station through a central charging-battery to earth, while the local storage battery at the substation of the line is connected in a ground branch from the line-circuit, together with a suitable resistance. The mechanism of the telephone set is arranged to disconnect the charging-battery from the line-circuit and to close it in a local circuit with the transmitting-telephone during the use of the instruments. When, however, a number of different stations are connected with a single line-wire or line-circuit to constitute what is generally termed a "party-line," it is found that the different local storage batteries cannot remain each normally connected in a ground branch from the line-circuit, since not only will the telephonic currents be shunted through the ground branches located between two stations between which conversation may be taking place, but the different local storage batteries will receive charging-currents of different strengths as the resistance between the main charging-battery and the different stations varies. I have arranged the local storage batteries at the different substations serially in the line-circuit, the line conductor being grounded through an inductive resistance or impedance coil after passing through the battery most distant from the central station. All the local storage batteries thus receive the same charging-current. At the same time loss in efficiency of telephonic transmission through the shunting of telephonic currents to ground is prevented, the impedance-coil at the distant station obstructing the passage of such currents to the ground branch at that point.

This invention is shown in the accompanying drawing.

In the diagram three substations A, B, and C are represented connected with a single line-circuit terminating in the usual signaling and switching apparatus at a central station. The telephone-line represented is a metallic circuit. One of the line conductors 1 is led to earth at the central station D through an impedance-coil $e$ and a battery $f$, which is the main charging-battery and may be common to the different lines of the telephone-exchange. This conductor is grounded at its distant extremity through another impedance-coil $g$. Included in conductor 1 at each substation is a pair of storage-battery cells, lettered $h$, $h'$, and $h^2$, respectively, at the different stations. The other appliances at the substations are of the usual type. They may comprise a signal-bell $i$, a receiving-telephone $k$, a transmitting-telephone $l$, an induction-coil $m$, and a switch-hook $n$, adapted to receive and support the telephone $k$. The lever of switch $n$ is connected by wire 3 with conductor 1 of the line-circuit at one side of the local storage battery $h$. An anvil of the switch, against which it rises when relieved from the weight of the telephone, constitutes the terminal of conductor 4, connected with the same line conductor at the other side of battery $h$, which conductor includes the transmitting-telephone $l$, together with the primary helix $m'$ of the induction-coil $m$.

Another similar contact-anvil of the switch forms the terminal of a conductor 5, which includes the secondary helix $m^2$ of the same coil and the receiving-telephone $k$. The normal resting contact of the switch is connected with the wire 6, which includes the signal-bell $i$. Thus when the telephone is not in use the bell $i$ is connected in a bridge between line conductors 1 and 2, while the battery $h$ is serially included in the line-circuit. When the telephone is removed from its switch-hook, a local circuit 3 4, including the transmitting-telephone $l$, is closed about battery $h$, while at the same time the circuit through the signal-bell is interrupted and that through the receiving-telephone is closed. During the idleness of the substation apparatus a current flows continually from battery $f$ through the impedance-coil $e$, the local storage batteries $h$, $h'$ and $h^2$, and the impedance-coil $g$ at the terminus of the line. The local storage batteries thus have a continual charging-current through them while the apparatus at no substation is in use. In practice these local storage batteries may have a capacity of about five or ten ampere hours. The normal charging-current might then approximate two-hundredths of an ampere, the resistances of impedance-coils $e$ and $g$, together with the resistance of the line, being made sufficient to permit only so much current from battery $f$.

When a telephone at a substation is removed from its switch-hook for use, the circuit is closed through the comparatively low resistance-bridge of the line-circuit which includes the receiving-telephone, so that sufficient current from the battery $f$ reaches line conductor 2 to excite a suitable signaling instrument in that circuit.

During the use of the line for conversation the telephonic currents in the line will traverse the line conductor 1, including the local storage batteries, without opposition from these batteries. No appreciable portion of the telephonic current will escape either through the impedance-coil $g$ at the terminus of the line or through the coil $e$ at the central station on account of the opposition presented by the self-induction of these coils.

I claim as new and desire to secure by Letters Patent—

1. The combination with a telephone-line, of a charging-battery in the main circuit, several local storage batteries at different substations included serially in the line-circuit, a telephone at each station in a bridge between the conductors of the line-circuit, a return-circuit for the charging-current connected with the line beyond the last station, and an impedance-coil $g$ in the return-circuit, substantially as described.

2. The combination with a telephone-line, of a charging-battery in the line-circuit, local storage batteries at different substations serially included in the circuit, a normal return-circuit for the charging-current connected with the line beyond the last station, and an inductive resistance in the return-circuit, a receiving-telephone and a secondary winding of an induction-coil in a bridge between the line conductor and a return-conductor at each substation, a transmitting-telephone, together with the primary helix of the induction-coil in a normally-open local circuit, of the storage battery at each substation, and a switch for closing the local circuit, as described.

3. The combination with a metallic telephone-line circuit, of a ground branch from one conductor of the line at a central station, including a charging-battery, several local storage batteries at different substations included serially in the same line conductor, a ground branch from the same conductor including an impedance-coil beyond the last station, and a telephone at each substation in a bridge of the metallic circuit, substantially as described.

In witness whereof I hereunto subscribe my name this 13th day of June, A. D. 1895.

CHARLES E. SCRIBNER.

Witnesses:
 ELLA EDLER,
 MYRTA F. GREEN.